United States Patent Office 3,165,774
Patented Jan. 19, 1965

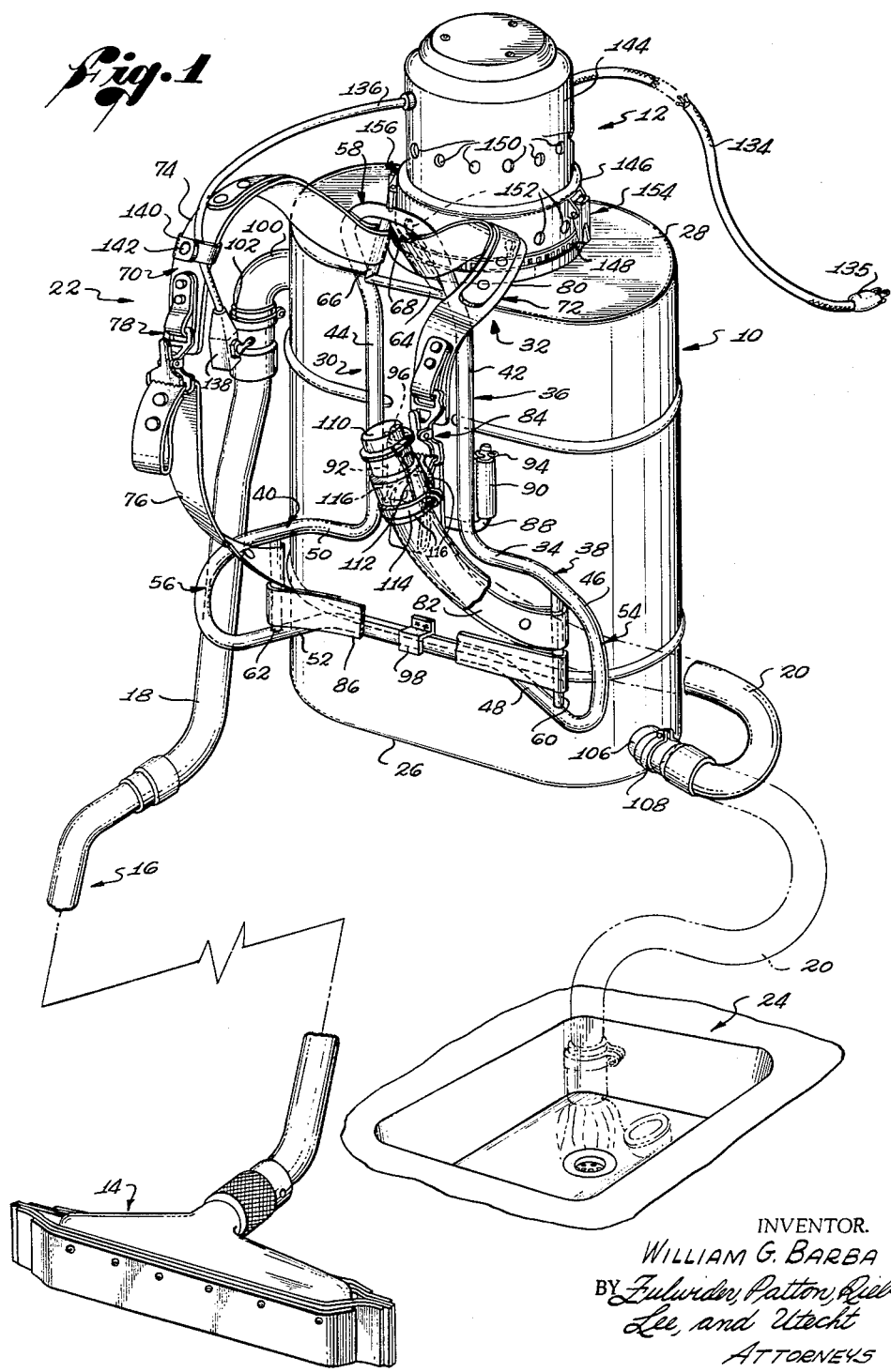

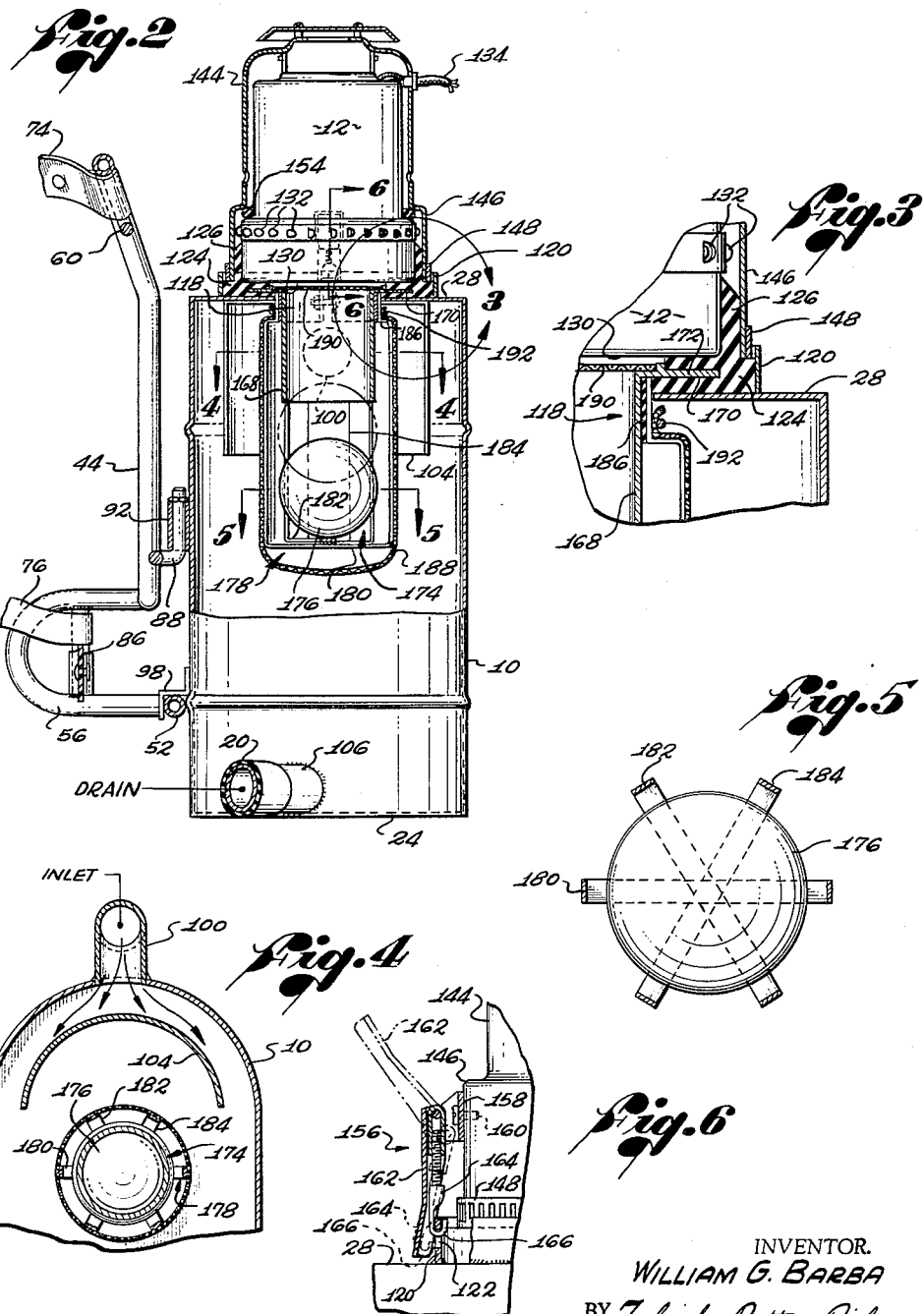

3,165,774
PORTABLE VACUUM APPARATUS FOR RAPID COLLECTION AND DISPOSAL OF DEBRIS-LADEN LIQUID
William G. Barba, Ontario, Calif., assignor to U.S. Divers Co., Inc., Santa Ana, Calif., a corporation of California
Filed Aug. 26, 1963, Ser. No. 304,605
10 Claims. (Cl. 15—323)

This invention relates to salvaging devices and, more particularly, to improvements in portable vacuum device for collecting and disposing of debris-laden liquids of the type described in the co-pending patent application Serial No. 209,409, filed July 21, 1962, now abandoned.

Occasionally a floor or other flat surface is covered with an unexpected or undesired quantity of liquid, as from leakage, or seepage. Whenever this occurs, there is an immediate need for means capable of rapidly and efficiently removing the liquid and any debris it contains. When the volume of the liquid is large, and if time and space permit, large volume pumping apparatus may be used to drain off the liquid. However, even when a relatively small amount of liquid is involved, close quarters and/or the need for haste make it neither economical nor practical to utilize heavy, bulky equipment in the clean-up operation, e.g., in an upper floor of a home or apartment building after extinguishing a fire with water hoses.

Various types of liquid collectors have been known for years, but their complexity, size and weight limit their use to large, flat areas, generally at ground level. A typical liquid collector includes a relatively large liquid storage tank which is mounted on casters so it can be wheeled to the work area, and into which liquid is drawn by a large, electrically powered suction pump through a rather complex combination of a hose, gasket and isolating baffles.

Such previously known liquid collectors are bulky and difficult to maneuver, and a number of men are needed to maneuver such apparatus particularly when there is any appreciable amount of liquid in the tank. To dispose of the liquid, the pump is disconnected from the power source and the apparatus is wheeled out of the work area to a position near a floor drain or the like. Then the tank is emptied by manually turning a valve located in a drain spout that is provided on the bottom of the tank. The valve is then closed, the apparatus is wheeled back to the work area, and the pump is connected to the power source to put the apparatus in operation again.

Due to their size, weight and construction, and the manner in which they must be handled and operated, these prior art liquid collectors are at best useful only to remove the bulk of a body of liquid. Where they are used, considerable liquid is left standing in small surface areas which cannot be reached with them. To minimize unsanitary conditions and structural damage from such remaining puddles, it is still necessary to resort to mops, sponges and rags for thorough clean-up.

It is an object of this invention to provide a compact, lightweight, liquid collector with which liquid can be quickly removed from areas inaccessible to prior art liquid collectors, and which can be handled by one man.

It is another object of this invention to provide a portable liquid collector of such effectiveness that its use does not require follow-up manual operations with mops, sponges and the like.

It is a further object of this invention to provide a liquid collector having extremely simple means for disposing of collected liquid without removing the device from the work area.

A still further object of this invention is to provide a portable device for collecting and disposing of liquid which comprises a minimum number of component parts of simple design and rugged construction.

The above as well as other objects and advantages of this invention will become apparent from the following detailed description when taken in conjunction with the accompanying drawings of an illustrative embodiment thereof, in which:

FIGURE 1 is a perspective view of a portable liquid collector in accordance with my invention;

FIGURE 2 is a side view, partly in section, of the device of FIGURE 1;

FIGURE 3 is an enlarged, fragmentary sectional view of the area indicated at 3 in FIGURE 2;

FIGURE 4 is a sectional view taken along the line 4—4 in FIGURE 2;

FIGURE 5 is a sectional view taken along the line 5—5 in FIGURE 2; and

FIGURE 6 is an enlarged, fragmentary sectional view taken along the line 6—6 in FIGURE 2.

Referring to FIGURE 1, the device shown includes a lightweight tank 10 for receiving and discharging liquid and debris. The tank 10 supports suction creating means, such as electrically operable vacuum motor 12, for causing liquid and debris to be drawn into the tank through a squeegee 14, a wand 16, and a flexible recovery hose 18. To provide for easy emptying of the tank 10, a capped, flexible disposal hose 20 is connected to the tank 10 at a point adjacent the bottom of the tank. The assembly is supported by a pack assembly 22 so it can be carried by the operator.

Briefly, in operation, the pack assembly 22 is hooked to the tank 10 and positioned on the back of the operator. The combination is then carried to an undesired liquid deposit and the motor 12 is energized to create a vacuum within the tank. The squeegee 14 is placed against the surface to be cleaned, and the vacuum draws liquid upward through the squeegee, the wand 16, and the recovery hose 18 into the tank. When the tank is full, further suction is automatically prevented. The tank is emptied into a nearby drain, e.g., a sink 24 in the room, by uncapping the disposal hose 20 and inserting it in the sink. The disposal hose is then recapped and the tank is again filled in the manner described. The filling and emptying of the tank is repeated as necessary to completely clean up the liquid and any debris contained in the liquid. During all these operations, the tank is not removed from the operator's back.

Preferably, as shown, the tank 10 is oblong in cross-section and is of such length that when carried its lower end 26 is adjacent the operator's waist and its upper end 28 is substantially at shoulder height. Referring to FIGURES 1 and 2, the pack assembly includes a rack member 30 and a harness 32 which cooperate to maintain the tank out of contact with the operator, and to permit the weight of the entire apparatus to be distributed over his back and shoulders.

As represented, the rack 30 is shaped generally like an inverted T with the ends of its center portion and crosspiece bent forward, as indicated at 54, 56 and 58. The rack is formed, in part, from a length of light, hollow tubing 34, whereby the center portion 36 and the arms 38, 40 are each U-shaped elements, with the legs 42, 44 of the center portion joined to respective legs 46, 50 of the arms 38, 40, and the remaining legs 48, 52 of the arms joined together.

To lend structural rigidity to the rack 30, as well as to provide means for attaching the harness 32 to the rack, substantially vertical rods 60 and 62 extend across the end sections 54 and 56 respectively. In addition, three rods 64, 66 and 68 form a triangle which is secured within the bent end section 58 of the central portion 36.

The harnes 32 extends between the rod 66 and the rod 62 and between the rod 68 and the rod 60. In particular, the harness 32 comprises a pair of shoulder straps 70 and 72. The shoulder strap 70 includes an upper portion 74 and a lower portion 76. The upper portion 74 is fixedly looped about the rod 66 and has a spring-biased buckle 78 coupled thereto. The lower portion 76 is fixedly looped around the rod 62 and is received by the buckle 78. The buckle 78 thus provides means for lengthening or shortening the total shoulder strap 70 to the comfort of the operator.

The shoulder strap 72 is similar to the shoulder strap 70 and includes an upper portion 80 and a lower portion 82. The upper portion is fixedly looped around the rod 68 while the lower portion is fixedly looped around the rod 60. A lower portion 82 passes through a spring biased buckle 84 which is coupled to the upper portion 80. In this manner, the total length of the shoulder strap 72 may be adjusted to the comfort of the operator.

The rods 60 and 62 also support a taut cross strap 86, which of course is spaced forwardly of the tank (see FIGURE 2). The cross strap 86 contacts the small of the operator's back and keeps the rack 30 and the body of the tank 10 spaced from the back of the operator.

To couple the rack 30 to the tank 10, the rack includes a U-shaped member 88 extending between the sections 42 and 44 of the central portion 36. The arms of the U-shaped member 88 are adapted to receive a pair of tubular members 90 and 92 which are welded to the front of the tank 10. After inserting the arms of the member 88 in the tubular members 90, 92, cotter keys 94, 96 are passed through the ends of the arms of the member 88.

It should also be noted that when the arms of the U-shaped member 88 are inserted in the tubular members 90, 92 as illustrated, the continuous rod formed from the arms 48, 52 of the crosspiece is also captured by a bracket member 98 which is welded to the front of the tank. Thus, the entire assembly is supported on spaced points on the rack, and the tank is secured against movement relative to the rack.

As previously mentioned, liquid and debris are drawn into the tank 10 through the squeegee 14, the wand 16, and the recovery hose 18. In this connection, an inlet pipe 100 is secured in the right side wall of the tank adjacent its upper end 28. As illustrated in FIGURE 1, the inlet pipe 100 extends downward to receive one end of the recovery hose 18. The hose 18 is secured to the inlet pipe 100 by an adjustable clamp 102. A baffle plate 104 is secured to the inner surface of the top 28 of the tank 10 adjacent to and across the inlet pipe 100 (see FIGURE 4). Thus, liquid passing through the inlet pipe 100 is dispersed by the baffle plate 104.

When the tank 10 is full, it is rapidly drained through an outlet pipe 106 and the disposal hose 20. As illustrated in FIGURES 1 and 2, the outlet pipe 106 extends through the left side wall of the tank 10 immediately adjacent its lower end 26. The outlet pipe 106 has one end of the disposal hose 20 removably connected thereto, as by an adjustment clamp 108. The other end of the hose is normally covered with a removable cap 110, which is adapted to fit snugly on the hose. Furthermore, the hose 20 and the cap 110 are preferably made of a material (e.g., neoprene or other suitable plastic) which permits such effective frictional engagement that the cap will not be dislodged by internal pressure in any position of the hose, but requires manual effort to remove the cap. When the cap is removed, it is still held to the hose, as by means of a cord 112 connected at its ends to the cap and the hose by a clamp 114.

The disposal hose 20, thus capped and sealed, is adapted for attachment to the harness 32 so as to be within easy reach of the operator. To accomplish this, a cord 116 is secured to the front of the harness, as on the left shoulder strap 72 below the buckle 84, and is looped around the disposal hose. When it is desired to evacuate the tank 10, the operator simply removes the end of the hose 20 from the harness, forces the cap 110 off the end of the hose, and lowers the end of the hose to allow liquid to flow directly from the tank into the drain.

Referring to FIGURES 2, 3 and 6, the vacuum motor 12 is seated over a central opening 118 in the top surface of the tank 10. In particular, the opening 118 is surrounded by a vertically extending collar or flange 120. The collar 120 includes a pair of elongated openings or apertures 122 (see FIGURE 6) on opposite sides of the opening 118. Seated around the opening 118 in contact with an inner surface of the collar 120 is a gasket 124. The gasket 124 includes a vertically extending continuous flanged portion 126 for receiving the motor housing.

The vacuum motor 12 illustrated comprises a conventional air cooled vacuum motor having a central air intake, represented at 130, and a plurality of air outlets 132 extending in a ring about the circumference of the motor. Power for the motor is supplied through a cable or cord 134, which has a plug 135 adapted for connection to a wall plug in a conventional manner. In addition, a short length of cord 136 is provided in series with the cord 134, and an on-off switch 138 on the end of the cord 136. The end of the short cord 136 is coupled to the front of the harness 32, as through a loop, defined by a flap member 140 and snap 142, extending around the right shoulder strap 74.

As will be seen, the arrangements of the inlet hose 18, the switch 138 and the disposal hose 20 permit the operator to operate the equipment with great ease. After inserting the plug 135 into a wall socket, he has both hands free to manipulate the switch 138 and the wand 16 as needed to energize the motor, draw the liquid into the tank, and turn off the motor. When he moves to the drain to empty the tank, the operator can handle the disposal hose 20 with his left hand while holding the wand 16 in his right hand. After the tank is emptied and the disposal hose is capped and replaced on the harness, the operator simply moves to another spot and flips the switch to the "on" position for another filling cycle. Throughout the filling and emptying operations, the power cord 134 remains connected to the wall socket.

As illustrated, the lower end of the motor 128 is seated within the flanged portion 126 of the gasket 124 such that the air intake 130 communicates directly with the central opening 118. With this arrangement, the motor is adapted to draw air from the tank 10 and discharge it through the outlet ports 132, and thereby create a sufficient vacuum to draw liquid into the tank as previously described.

As illustrated, the motor 128 is surrounded by a cover member 144, the inner dimensions of which are slightly larger than the motor housing. The lower end portion 146 of the cover member 144 is dimensioned to fit snugly around the outer surface of the annular flanged portion 126 of the gasket 124. The cover member 144 is also secured to the gasket 124 by an annular clamp 148. The clamp 148 is tightened to press the cover member 144 tightly against the gasket 124 causing the gasket to compress tightly around the outer surface of the motor housing. In this manner, an air tight seal is created between the lower ends of the cover member 144, and the motor housing.

The cover member 144 includes two sets of outlet ports 150, 152. The ports 150 extend around the circumference of the cover and are isolated from the ports 152 by an O-ring 154. The O-ring 154 extends around the motor in contact with the inner surface of the cover member 144 above the ring of air outlets 132. The ports 150 provide normal air ventilation cooling for the motor 128. The ports 152 provide an escape for air exhausted by the motor from the tank through the air outlet ports 132. It is to be noted in FIGURE 1 that the ports 152 are evenly spaced about the cover member 144 except in the area directly behind the central portion 36 of the rack 30. In this manner, air vented from the cover member 144 is directed away from the neck of the operator.

The motor 128 and cover 144 are securable to the tank 10 by a pair of similar hand operable latches 154 and 156. As best seen in FIGURE 6, the latch 156 comprises a U-shaped bracket 158 coupled by a screw 160 to the cover member 144. An arm member 162 is pivotally coupled to the bracket 158. Pivotally coupled to an end of the arm 162 is a latching member 164 having a U-shaped lower lip section 166. The lower lip 166 is dimensioned to engage the opening 122 in the collar 120. The solid line representation indicates the latch 156 in a latched condition while the broken line representation illustrates the latch in a disengaged condition.

As represented, when the arm 162 is pivoted upward, the latching member 164 moves down and away from the opening 122 such that the cover member 144 toegther with the motor 12 may be removed from the tank 10. Downward movement of the arm 162 pivots the latching member 164 upward to engage the opening 132 as illustrated. The latching member 164 exerts an upward force on a collar 120 to urge the cover member 144 and the lower end of the motor housing tightly against the gasket 124. This compresses the gasket 124 to create an air tight seal between the gasket and the top 28 of the tank 10.

It is a feature of the present invention that the air intake 130 to the motor 128 is automatically sealed off when liquid arises in the tank 10 to a predetermined level. Such means is most clearly illustrated in FIGURES 2-5, and includes a tubular member 168 having a substantially flat annular flanged portion 170 extending radially outward from an upper end of the tubular member. The flanged portion 170 is seated within an annular slot 172 which extends about the inner surface of the gasket 124. The flanged portion 170 thus supports the tubular member 168 such that the tubular member extends downward within the tank 10 and communicates with the central opening 118 and the air intake 130.

The lower end of the tubular member 168 forms a valve seat for a ball type valve 174. The ball valve 174 comprises a rubber ball 176 captured within a cage 178. The cage 178 is formed of a plurality of U-shaped metal strips 180, 182 and 184 coupled to a vertically extending annular ring 186. The ring 186 extends tightly about the upper end of the tubular member 168.

As liquid rises in the tank 10, the ball 176 rises in the cage 178. When the liquid within the tank reaches a predetermined level, the ball 176 becomes seated within the lower end of the tubular member 168 thereby preventing further air from being drawn from the tank into the motor 128. This is accompanied by a hissing sound which indicates to the operator that the tank is full and ready for emptying.

It is an additional feature of the present invention that debris in the liquid entering the tank is prevented from entering and possibly fouling the operation of the motor 128. This is accomplished by including a filter bag 188 around the cage 178 and a fine mesh screen 190 over the upper end of the tubular member 168. The filter bag 188 is secured about the cage by a draw string 192 while the screen 190 rests on the top of the flanged portion 170 seated within the annular slot 172 in the gasket 124.

It is a further feature of this invention that the mounting arrangement and design of the vacuum collector permit the use of a relatively small, light weight, and inexpensive motor while maintaining a high efficiency of overall operation. For example, when a 60 cycle, 6 amp 600 watt motor is employed, liquid is drawn into the tank 10 at a rate in excess of 1 qt. per second.

The rate at which the tank 10 may be emptied of liquid is also an important feature of this invention. In particular, the design of the liquid outlet adjacent the bottom of the tank and a connection of the flexible disposal hose thereto provides means for emptying the tank at a rate in excess of ½ gal. per second.

The high speed filling and emptying features combine to allow the use of a light weight low capacity tank which may be rapidly filled and emptied to remove large volumes of liquid. The small capacity tank is not particularly heavy when filled and therefor places relatively little strain on the operator in maneuvering with the assembly on his back. As will be appreciated, the rapidity with which the tank can be emptied is useful in flushing out the tank after use, as by using the apparatus to draw in and to discharge clean water.

As described, the vacuum apparatus of the present invention is easily assembled and operated. The apparatus is just as easily disassembled for storage when not in use. To disassemble the apparatus, the hoses 18 and 20 are removed from the tank 10 by simply loosening the clamps 102 and 108. If desired, the pack 30 may be separated from the tank by removing the cotter keys 94 and 96 and slipping the member 88 from the tubes 90 and 92. Since the assembly of the tank 10 and motor 12 is extremely light weight, it may be mounted on a wall with the pack for easy access much the same as an ordinary fire extinguisher. The disposal and recovery hoses being highly flexible may be looped about the tank, or they may be stored inside the tank, as by removing the motor and inserting the hoses in the large opening in the top of the tank.

Although a specific embodiment of the present invention has been described in detail, it is to be understood that other embodiments and modifications are possible without departing from the spirit of the present invention. Accordingly, it is intended that my invention shall not be limited except as by the following claims.

I claim:
1. A portable liquid vacuum cleaner, comprising:
an upright tank having a top and a bottom and including an opening in the top, a liquid inlet port adjacent the top, and a liquid outlet port adjacent the bottom of the tank;
flange means extending from the top of the tank at points spaced slightly from the opening in the top of the tank, the flange means including apertures on opposite sides of the opening;
removable means for sealing the outlet port;
an electric suction creating means having an air intake in its lower surface and an air outlet port remote from the air intake;
a compressible gasket seated about the central opening, the gasket including a vertically extending continuous flange portion for receiving and supporting a lower end of the suction creating means over the opening in the top of the tank such that the air intake communicates with the opening and the air outlet is external to the tank;
a cover member dimensioned to fit over the suction creating means, the cover member having a lower end portion which fits tightly about the outer surface of the vertically extending flange portion of the gasket;
means for tightly securing the cover member about the gasket; and
hand operable latch members coupled to the cover member for engaging the openings in the flange means to secure the cover and the suction creating means to the tank.
2. A portable liquid vacuum cleaner, comprising:
an upright tank having a top and a bottom and including an opening in the top, a liquid inlet port, and a liquid outlet port adjacent the bottom of the tank;
a continuous flange extending vertically from the top of the tank around and spaced from the opening in the top of the tank, the flange including apertures on opposite sides of the opening;
removable means for sealing the outlet port;

an electric suction createing means having an air intake in its lower surface, and an air outlet port remote from the air intake;
a compressible gasket seated about the opening in the top of the tank, the gasket including a vertically extending continuous flange portion for receiving and supporting a lower end of the suction creating means over the opening such that the air intake communicates with the opening and the air outlet is remote from the tank, the gasket further including a continuous slot in its inner surface;
a cover member dimensioned to receive the suction creating means, the cover member having a lower end portion which fits tightly about the outer surface of the vertically extending flange portion of the gasket;
means for tightly securing the cover member about the gasket;
hand operable clamp coupled to the cover member for engaging the aperatures in the flange extending from the top of the tank to secure the cover to the tank;
a tubular member having an outwardly extending substantially flat flanged portion positioned within the continuous slot in the gasket such that the tubular member communicates with the air intake and extends downward within the tank to define a ball valve seat;
a ball; and
a cage extending about and down from the tubular member for supporting the ball to seal the air intake when liquid in the tank rises to a predetermined level.

3. The apparatus defined in claim 2 including a filter bag surrounding the cage.

4. The apparatus defined in claim 2 including a screen positioned over an end of the tubular member adjacent to the air intake.

5. A portable liquid vacuum cleaner, comprising:
an upright tank having a top and a bottom and including an opening in the top, a liquid inlet port adjacent the top, and a liquid outlet port adjacent the bottom of the tank;
removable means for sealing the outlet port;
suction-creating means having an air intake in its lower surface and an air outlet remote from the air intake;
a compressible gasket seated around the opening in the top of the tank, the gasket including a vertically extending flanged portion for receiving and supporting a lower end of the suction-creating means over the opening in the top of the tank such that the air intake communicates with the opening and the air outlet is external to the tank;
a cover member dimensioned to fit over the suction-creating means, the cover member having a lower end portion which fits tightly around the outer surface of the vertically extending flanged portion of the gasket;
and hand operable means on the cover and engaging the top of the tank for coupling the cover and the suction-creating means to the tank.

6. The apparatus of claim 5 including a pack for transporting on the back including a rack for vertically supporting the tank and a harness including a pair of shoulder straps coupled to the rack.

7. The apparatus of claim 6 wherein the cover member includes a plurality of holes spaced so as to vent air from the suction-creating means in predetermined directions away from the rack.

8. The apparatus of claim 6 wherein said ports are on opposite sides of the vertical center line of said tank, and including:
a recovery hose coupled to the inlet port for passing liquid into the tank;
a disposal hose coupled at one end to the outlet port for draining the tank;
a removable cap for normally sealing the other end of the disposal hose;
and means for attaching the other end of the disposal hose to the shoulder strap nearest thereto so that it is within easy reach of the operator.

9. A portable, back-mounted liquid vacuum cleaner, comprising:
an upright tank having a top and a bottom and including an opening in the top, a liquid inlet port on one side of the tank adjacent to the top thereof, and a liquid outlet port on the other side of the tank adjacent the bottom thereof.
flange means extending from the top of the tank at points spaced slightly from the opening in the top of the tank, the flange means including apertures on the opposite sides of the opening;
a recovery hose coupled to the inlet port for passing liquid into the tank;
a disposal hose coupled at one end to the outlet port for draining the tank;
a removable cap to be frictionally fitted onto and sealingly engage the other end of the disposal hose;
an electric suction-creating means having an air intake in its lower surface and an air outlet port remote from the air intake;
a compressible gasket seated about the opening in the top of the tank, the gasket including a vertically exending continuous flange portion for receiving and supporting a lower end of the suction-creating means over the opening in the top of the tank such that the air intake communicates with the opening and the air outlet is external to the tank;
a cover member dimensioned to fit over the suction-creating means, the cover member having a lower end portion which fits tightly about the outer surface of the vertically extending flange portion of the gasket;
means for tightly securing the cover member about the gasket;
hand operable latch means coupled to the cover member for engaging the openings in the flange means to secure the cover and the suction-creating means to the tank;
a pack for transporting on the back including a rack for vertically supporting the tank and a harness including a pair of shoulder straps secured to the rack;
and means for removaly attaching said other end of the disposal hose to the shoulder strap nearest said disposal hose.

10. The apparatus defined by claim 9 wherein the suction creating means includes an electric vacuum motor having an on-off control switch coupled to the motor by a flexible electrical cable, and including means for attaching the cable to the harness such that the on-off switch is within easy reach of the operator when transporting the vacuum cleaner on his back.

References Cited by the Examiner
UNITED STATES PATENTS

| | | | |
|---|---|---|---|
| 2,243,673 | 5/41 | Henry. | |
| 2,566,030 | 8/51 | McGuire. | |
| 2,675,150 | 4/54 | Ackerman | 224—5.23 |
| 2,684,787 | 7/54 | Charpiat | 222—175 |
| 2,989,769 | 6/61 | Houser | 15—353 |
| 3,006,020 | 10/61 | Fillery. | |
| 3,082,465 | 3/63 | Wood | 15—327 |

FOREIGN PATENTS 946,682   12/48   France.

WALTER A. SCHEEL, *Primary Examiner.*